Patented Aug. 5, 1952

2,606,198

UNITED STATES PATENT OFFICE 2,606,198

HALOSTEROID ALCOHOLS AND PREPARATION OF SAME

Romeo B. Wagner, State College, Pa., and James A. Moore, Detroit, Mich., assignors to Parke, Davis & Company, Detroit, Mich., a corporation of Michigan No Drawing. Application December 3, 1949, Serial No. 131,056

6 Claims. (Cl. 260—397.5)

1

This invention relates to steroids and the preparation of the same. More particularly, the invention relates to steroids of the pregnene series characterized by having a hydroxyl or ester group on $C_{21}$, a bromine atom on $C_{20}$ and a double bond at $C_{17}$–$C_{20}$. These bromo-pregnenes can be represented by the following formula:

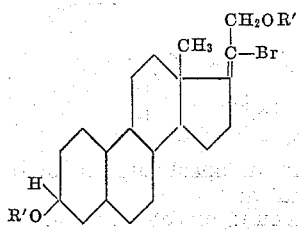

where R' is hydrogen or a lower carboxylic acid acyl radical.

In accordance with the invention 20-bromo-$\Delta^{17}$-pregnenes having the above formula are prepared by reducing the corresponding 20-bromo-$\Delta^{17}$-pregnen-21-oic acids, or alkyl esters of same, having the formula:

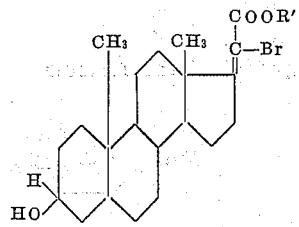

with lithium aluminum hydride in a lower aliphatic ether as a solvent, where R' is hydrogen or a lower alkyl radical. The reaction takes place smoothly in a short period of time and the temperature range is about 20–80° C. but preferably at 35–45° C. At the end of the reaction the mixture is treated first with water to decompose any excess lithium aluminum hydride and then with a dilute mineral acid, such as dilute sulfuric or dilute hydrochloric acid, to effect decomposition of the metal complex salt of the alcoholic products.

Diagrammatically this transformation may be illustrated as follows:

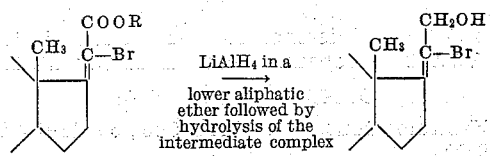

where R is hydrogen or a lower alkyl radical. The alcohols thus formed can be converted to the corresponding carboxylic acid acyl derivatives upon treatment with the anhydride of a lower aliphatic carboxylic acid alone or in the presence of a basic substance such as an organic tertiary amine.

2

The products of the invention are useful intermediates for the preparation of other organic compounds and, in particular, for the preparation of steroids similar in structure to those found in the adrenal cortex.

The following examples are illustrative.

Example 1

2.4 g. of methyl 20-bromo-3($\beta$)-hydroxy-$\Delta^{17}$-pregnen-21-oate in 100 cc. of freshly distilled ether is added dropwise to a solution of 1.1 g. of lithium aluminum hydride in 600 cc. of ether over a one-half hour period, the solvent refluxing slowly during the addition. Water is then added to destroy the excess hydride and the complex salt is hydrolyzed with dilute hydrochloric acid. Most of the product separates and is filtered. The layers are separated and the ethereal portion washed with dilute potassium hydroxide and water. The residue obtained on evaporation of the ether is combined with the filtered material and the whole is crystallized from methanol yielding glistening prisms of 20-bromo-$\Delta^{17}$-pregnen-3($\beta$), 21-diol, M. P. 251–3° C., $(\alpha)_D^{25} = +53°$ (C=1.501 in dioxane). This product has the formula,

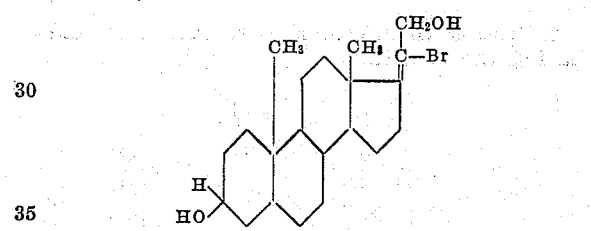

Example 2

400 mg. of 20-bromo-$\Delta^{17}$-pregnen-3($\beta$),21-diol is allowed to stand for ten hours in 8 cc. of acetic anhydride and 8 cc. of pyridine. The reaction mixture is then poured into a large volume of water, stirred for one-half hour and then extracted with ether. The ethereal extract is washed with dilute hydrochloric acid, water, dilute sodium bicarbonate solution and water. The dried extract is concentrated and the residue crystallized from methanol to yield prisms of 20-bromo-$\Delta^{17}$-pregnen-3($\beta$),21-diol diacetate, M. P. 149–150° C. This product has the formula,

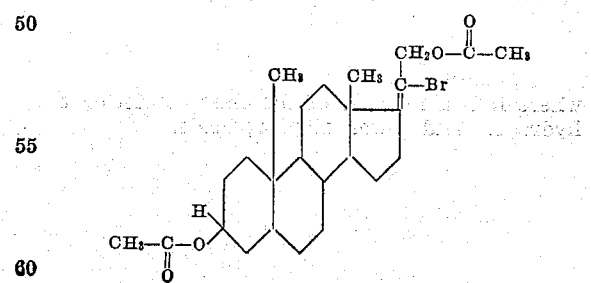

The 20-bromo-Δ[17]-pregnen-21-oic acids and esters of same used as starting materials in the practice of this invention may be prepared by the methods described and claimed in our copending application Serial No. 131,055, filed under even date herewith, now Patent No. 2,606,197. Said methods comprise reacting 17,21,21-tribrominated pregnanes with an alkali metal hydroxide dissolved in a lower aliphatic alcohol and at a preferable reaction temperature of about 85–95° C. The resulting acids are converted to the corresponding esters by treatment of the acids with a diazoalkane in an inert organic solvent.

The 17,21,21-tribrominated pregnanes may be prepared by the methods described and claimed in our copending application Serial No. 131,054, filed under even date herewith. Said methods comprise bromination at a temperature above 50° C. of the corresponding pregnanolones.

What we claim is:

1. Process which comprises reacting with lithium aluminum hydride in a lower aliphatic ether at a temperature between 20° and 80° C., a steroid having at ring D the structure,

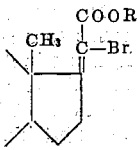

where R is a member of the class consisting of hydrogen and lower alkyl radicals and hydrolyzing the intermediate complex so formed with aqueous acid thereby obtaining a steroid alcohol having at ring D the structure,

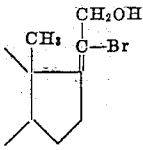

2. Process which comprises reacting a steroid having the structure,

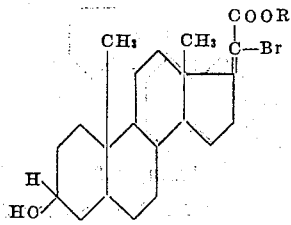

with lithium aluminum hydride in a lower aliphatic ether at a temperature between 20° and 80° C. and hydrolyzing the intermediate complex so formed with aqueous acid thereby obtaining a steroid alcohol having the formula,

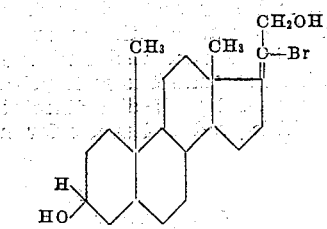

where R is a member of the class consisting of hydrogen and lower alkyl radicals.

3. Process according to claim 2 which comprises thereafter reacting said steroid alcohol with the anhydride of a lower aliphatic carboxylic acid alone or in the presence of an alkaline substance to obtain an ester of a steroid alcohol having the formula,

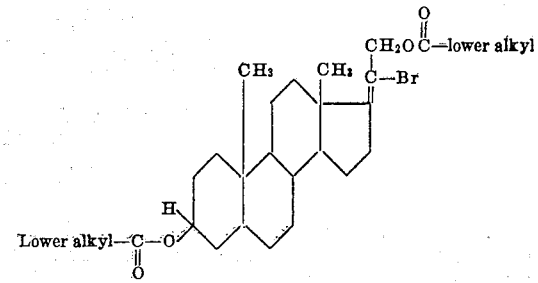

4. A compound of the formula,

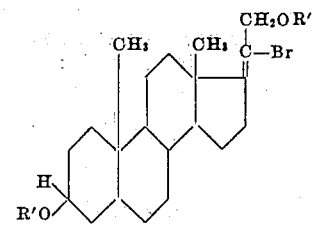

where R' is an unsubstituted lower carboxylic acid acyl radical.

5. A compound of the formula,

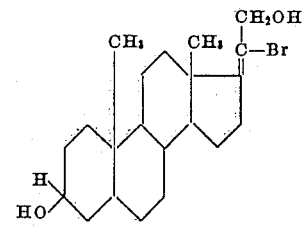

6. A compound of the formula,

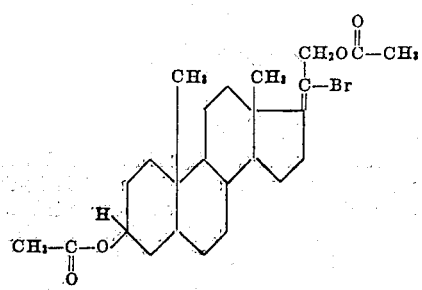

ROMEO B. WAGNER.
JAMES A. MOORE.

REFERENCES CITED

The following references are of record in the file of this patent:

UNITED STATES PATENTS

| Number | Name | Date |
|---|---|---|
| 2,205,627 | Miescher | June 25, 1940 |
| 2,259,698 | Johannessohn | Oct. 21, 1941 |

OTHER REFERENCES

Nystrom: Jour. Am. Chem. Soc., 69, 1197–1199 (1947).